(12) United States Patent
Hanya

(10) Patent No.: US 7,021,914 B2
(45) Date of Patent: Apr. 4, 2006

(54) TIRE MOLD

(75) Inventor: Masahiro Hanya, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/136,493

(22) Filed: May 2, 2002

(65) Prior Publication Data

US 2002/0162941 A1 Nov. 7, 2002

(30) Foreign Application Priority Data

May 2, 2001 (JP) ............................. 2001-135415

(51) Int. Cl.
*B29C 35/02* (2006.01)
(52) U.S. Cl. ..................... 425/28.1; 249/141; 264/501; 425/812
(58) Field of Classification Search ............... 425/28.1, 425/35, 812; 249/141; 264/501, 326
See application file for complete search history.

(56) References Cited

U.S. PATENT DOCUMENTS 4,026,512 A * 5/1977 Holt ........................... 425/812
4,708,609 A * 11/1987 Yoda et al. ................. 425/28.1
4,795,331 A * 1/1989 Cain et al. .................. 428/28.1
5,382,402 A 1/1995 Espie et al. ................. 264/326
5,431,873 A 7/1995 Vandenberghe ............. 264/226
5,866,171 A * 2/1999 Kata ........................... 425/28.1
6,206,336 B1 3/2001 Espie et al. ................. 249/141
6,491,854 B1 * 12/2002 Sano ........................... 425/812

FOREIGN PATENT DOCUMENTS

| DE | 19628166 A1 | 1/1998 |
| DE | 19923952 A1 | 12/1999 |
| EP | 0818290 A2 | 1/1998 |
| GB | 2050931 A | 1/1981 |
| JP | 63021112 A | 1/1988 |
| JP | 63264308 A | 11/1988 |

* cited by examiner

Primary Examiner—James P. Mackey
(74) Attorney, Agent, or Firm—Birch, Stewart, Kolasch & Birch, LLP

(57) ABSTRACT

A tire mold including a molding face for shaping the outside of a tire and a vent structure, wherein the vent structure contains a hole having an opening in the molding face, an inserted piece disposed in the hole so that the surface of the inserted piece defines a part of a molding face, and a micro-gap of not more than 100 micrometers formed between the inserted piece and the hole for the purpose of vent.

12 Claims, 7 Drawing Sheets

/ TIRE MOLD

BACKGROUND OF THE INVENTION

The present invention relates to a mold for a rubber tire and more particularly to a vent structure which is especially suitable for a tire sidewall made of a thin sidewall rubber on the carcass.

In general, during manufacturing a pneumatic tire, a raw tire is vulcanized in a mold. As the surface of the raw tire closely contacts with the molding faces of the mold, the tire is provided with a designed desired shape. Therefore, to discharge the air between the mold and the raw tire, small vent holes usually having a diameter of 0.1 to 2 mm are formed in the molding faces. Such vent holes more or less cause spews on the surface of the vulcanized tire.

If spews are formed on the tread face, it would not be a significant matter because they would be easily removed during running and under cover of unevenness of the tread face due to tread grooves. However, such action and effect cannot be expected with respect to the spews on the sidewall. Therefore, the appearance of the tire is degraded.

SUMMARY OF THE INVENTION

It is therefore, an object of the present invention to provide a tire mold which can improve the appearance of the tire by preventing the occurrence of spews.

According to the present invention, the tire mold comprises a molding face for shaping the outside of a tire and a vent structure, wherein the vent structure comprises a hole having an opening in the molding face, an inserted piece disposed in the hole so that the surface of the inserted piece defines a part of a molding face and a micro-gap of not more than 100 micrometers formed between the inserted piece and the hole for the purpose of a vent.

BRIEF DESCRIPTION OF THE DRAWINGS

Embodiments according to the present invention will now be described in detail in conjunction with the accompanying drawings, wherein.

DETAILED DESCRIPTION OF THE INVENTION

Figure 1:
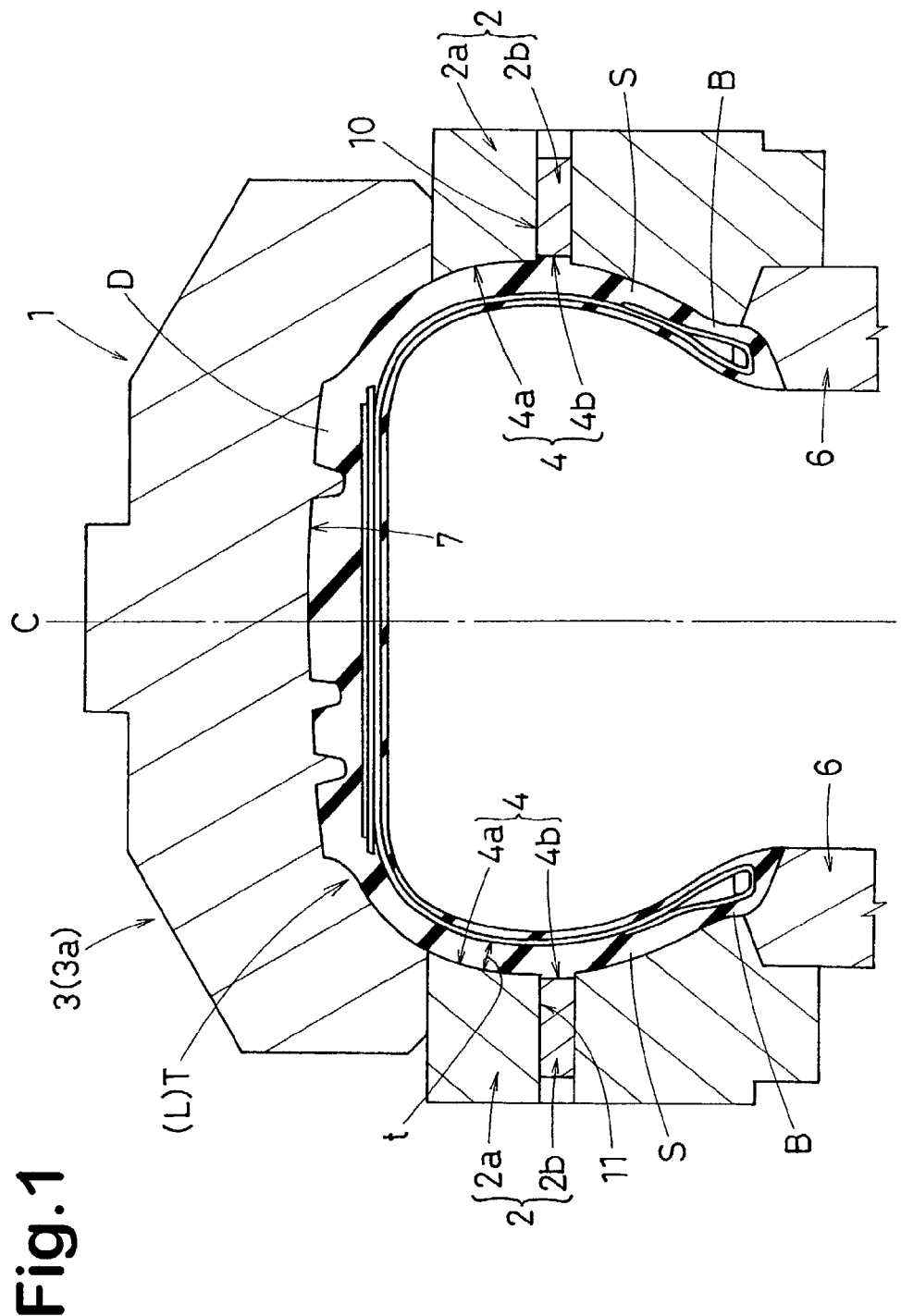
FIG. 1 is a sectional view of a tire mold according to the present invention.

In the drawings, a tire mold 1 according to the present invention comprise a tread ring 3, a pair of sidewall plates 2 and a pair of bead rings 6. The sidewall plates 2 are connected to the tread ring 3 on the radially outside thereof and the bead rings 6 on the radially inside thereof.

The tire mold 1 is for vulcanizing and molding a pneumatic tire T.

A pneumatic tire T comprises a tread portion having a tread D, a pair of axially spaced bead portions B, a pair of sidewall portions S extending therebetween, a carcass extending between the bead portions and turned up around a bead core in each bead portion, and a belt disposed radially outside the carcass in the tread portion.

As shown in FIG. 1, a raw tire is put in the mold, and the inside of the tire is pressurized using an inflated bladder (not shown) to press the outside of the tire onto the molding face or inside of the mold which is provided with a particular profile and various patterns. And during pressing, the tire is heated to vulcanized the raw materials.

The bead ring 6 is for holding and molding the bead portion B, and therefore provided with a bead molding face for shaping the base and axially outside of the bead portion B.

The tread ring 3 is made up of a plurality of circumferentially separate segments 3a which are arranged annually in the circumferential direction to thereby collectively define a circumferentially continuous tread molding face 7 for shaping at least the tread D of the tire T. The sidewall plate 2 is provided with a sidewall molding face 4 for molding the sidewall portion S.

In this embodiment, these parts are made of the same metallic material based on iron although they can be made of different metallic materials.

In order to open the mold for putting or taking out the tire, the segments 3a of the tread ring 3 are supported movably in the radial direction of the tire, and the sidewall plates 2 are movably supported in the tire axial direction.

Each of the sidewall plates 2 in this example is formed as a circumferentially continuous integral part. But, it is also possible that each plate 2 is made up of circumferentially separate segments.

Each of the sidewall plates 2 is provided in the sidewall molding face 4 with a vent structure.

According to the present invention, the vent structure comprises a hole 11 and an inserted piece 2b disposed within the hole 11. The hole 11 has an open end in the sidewall molding face 4 and in this embodiment it is formed on the main part 2a of the sidewall plate 2. The inserted piece 2b has a shape which can fit the hole 11. The piece 2b can be inserted in the opening of the hole 11 in the sidewall molding face 4 and it is detachable therefrom by pulling.

Figure 2:
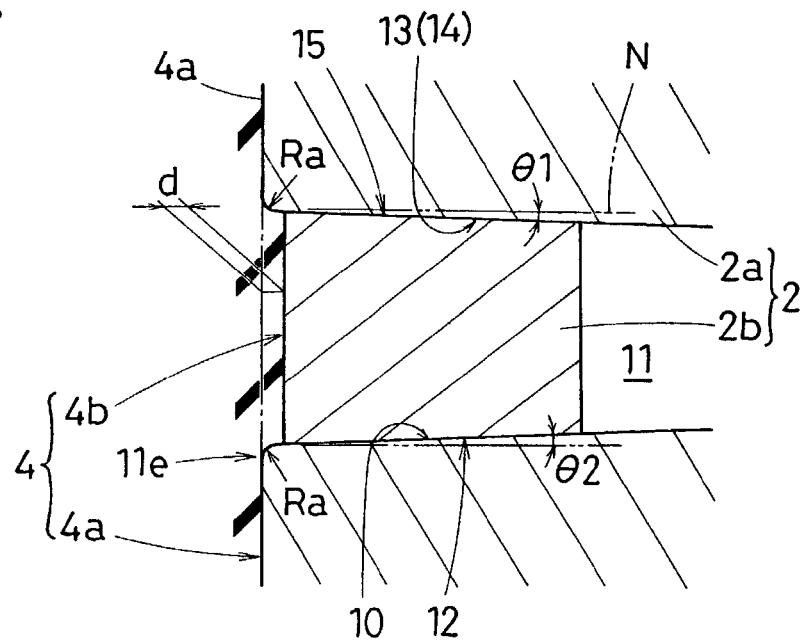
FIG. 2 is an enlarged cross sectional view of the vent structure thereof.

FIG. 2 shows an example of the vent structure, wherein the interior surface 13 of the hole 11 has a part 14 tapered at a small angle theta 1 towards the depthwise direction starting from the axially inner end thereof beyond the length of the inserted piece 2b. On the other hand, the exterior surface 12 of the inserted piece 2b is provided with a part 15 which is tapered at a small angle theta 2 in the same manner as the above-mentioned tapered part 14 to fit the tapered part 14 by inserting the piece 2b into the hole 11 from the inside of the mold. In this example, accordingly the tapered part 15 extends over the entire length. Preferably, the taper angles theta 1 and theta 2 are set in a range of not more than 3 degrees with respect to the normal direction N to the sidewall molding face 4, but not less than 0 degrees (namely, an inverse taper is excluded.)

Figure 3:
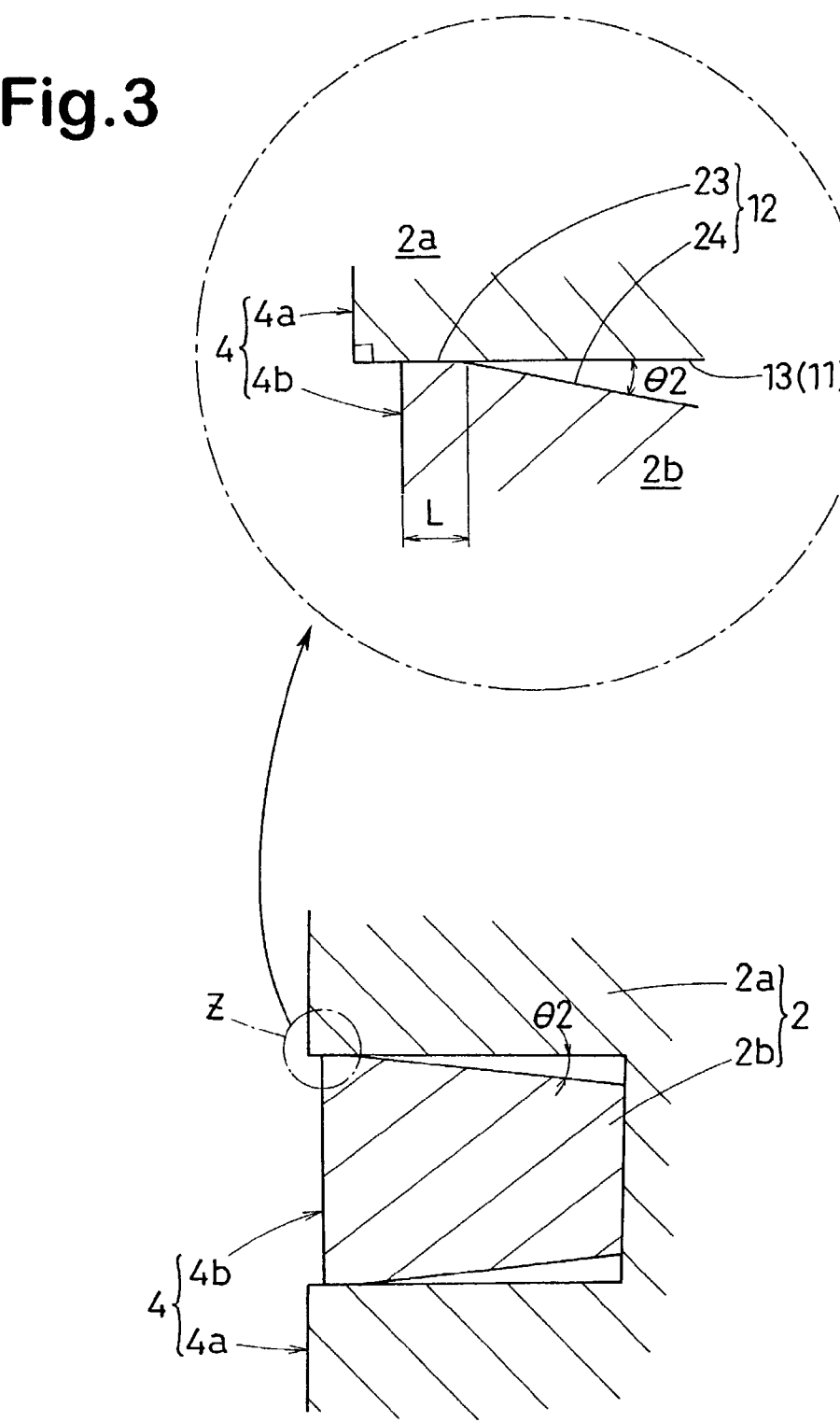
FIG. 3 is a cross sectional view of another example of the vent structure.

FIG. 3 shows another example of the vent structure, wherein the above-mentioned angle theta 1 is zero, namely, the interior surface 13 of the hole 11 does not have a tapered part.

On the other hand, the exterior surface 12 of the inserted piece 2b has a taper part 24 tapered at a small angle theta 2 to increase the gap between the surfaces 24 and 13 and a non-taper part 23 for fitting the non-tapered interior surface 13 for a short length. The non-taper part 23 is formed between the inner end of the piece 2b and the inner end of the taper part 24, and the length of the non-taper part 23 is set to be not more than 1 mm for example about 0.5 mm. The taper angle theta 2 is preferably set in a range of not more than 3 degrees but not less than 0 degrees with respect to the normal direction N to the sidewall molding face 4.

In any case, the sidewall molding face 4 is made up of at least the surface 4a of the main part 2a of the sidewall plate 2 and the surfaces 4b of the inserted pieces 2b.

Between the surface 4b of each of the inserted pieces 2b and the surrounding surface 4a of the sidewall plate main part 2a, a micro-gap 10 through which the air is allowed to pass is formed. Preferably, the micro-gap 10 is formed substantially continuously around the surface 4b.

The micro-gap 10 is set in a range of not more than 100 micrometers, preferably 5 to 10 micrometers. Thus, the micro-gap 10 is extremely small in comparison with the size of conventional vent holes, vent grooves and the like.

If the micro-gap is more than 100 micrometers, the softened rubber penetrates in the gap during vulcanizing and the tire appearance is degraded. If the micro-gap 10 is less than 5 micrometers, it is difficult to vent the air through the gap.

The micro-gap 10 may be formed by simply setting the size of the inserted piece 2b smaller than the hole 11. But it is preferable that the micro-gap 10 is formed by providing the interior surface 13 of the hole 11 and/or the exterior surface 12 of the inserted piece 2b (strictly speaking, at least a part in which they are contact with each other) with a specific roughness which is of the same order as the gap or slightly smaller than the gap. In this case, due to the roughness, the micro-gap 10 can be stably formed which continuously extends around the inward surface 4b.

In any case, as the micro-gap 10 has a larger resistance to air flow in comparison with the conventional vent hole or groove, it is preferable that the exhaust of air through the micro-gap 10 is forcedly made using a suction pump connected to the hole 11.

When the micro-gap 10 is formed as above, it is not necessary for the inside shape of the hole 11 and the outside shape of the piece 2b to be limited to a specific shape. However, it is preferable that the macro-gap 10 is formed so as to be operatively associated with embossed patterns in the tire sidewall S.

In the tire sidewall S, there are many embossed patterns or designs such as letters, marks, signs and the like which may be a brand name, manufacturer name, indications of the tire size, load, rotational direction and the like.

To be concrete, the above-mentioned hole 11 and inserted piece 2b are formed into the same shape as an embossed pattern, and the inserted piece 2b is placed at a certain depth (d) corresponding to the height of the embossed pattern.

Figure 4:
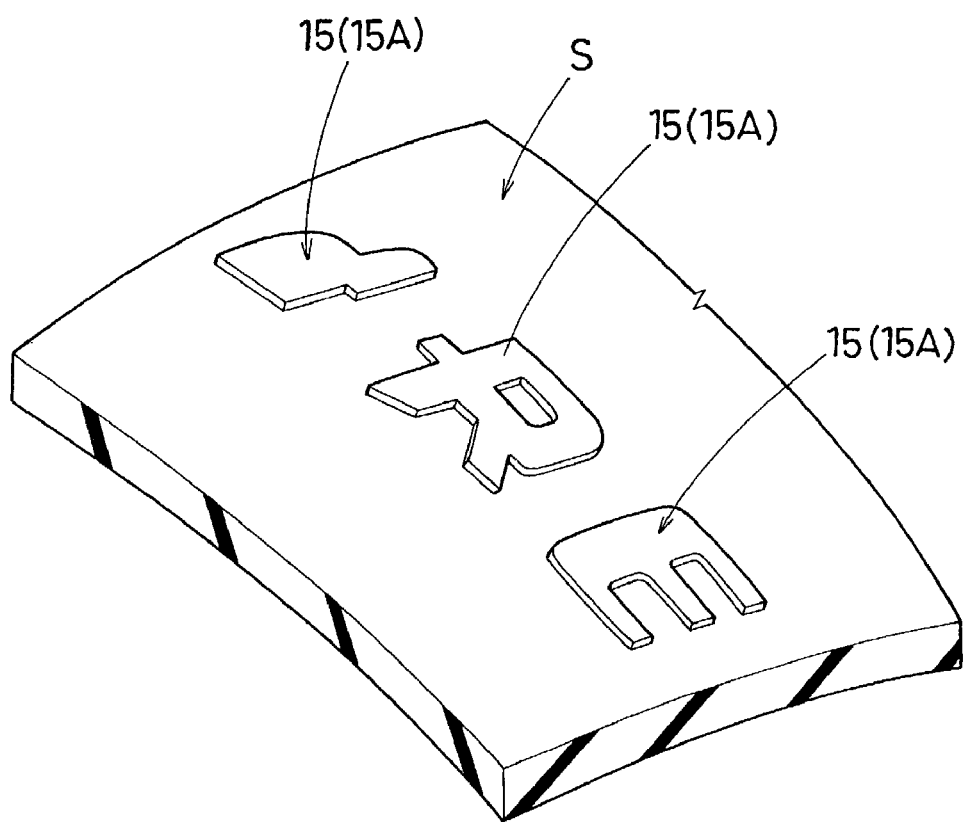
FIG. 4 is a perspective partial view of a tire sidewall showing embossed patterns.
Figure 5:
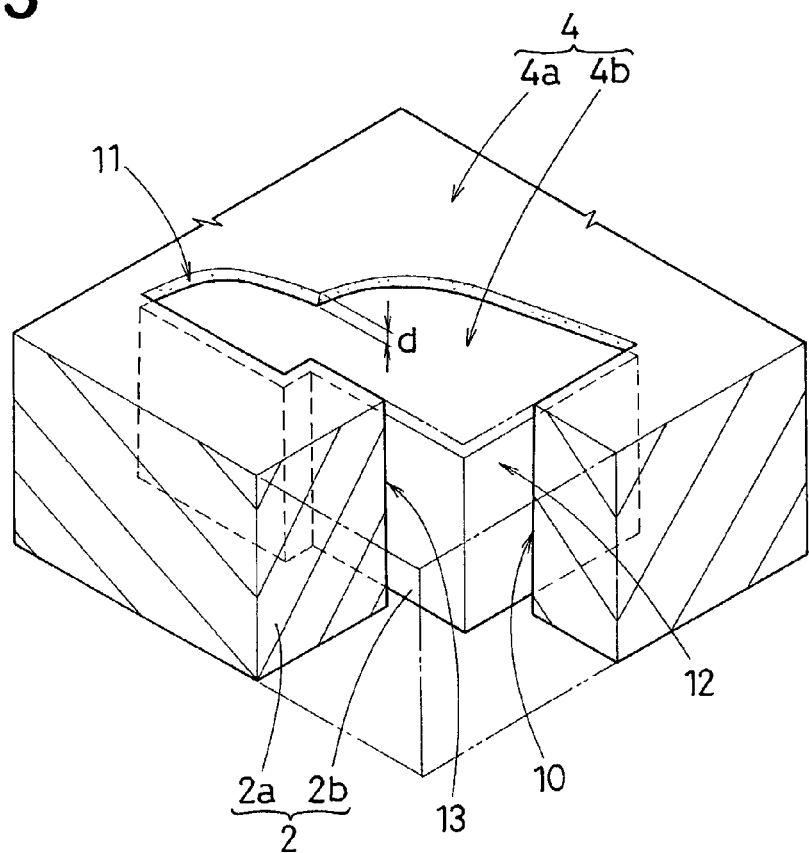
FIG. 5 is an enlarged perspective view of the vent structure which can be utilized to form one of the embossed patterns shown in FIG. 4.

FIG. 4 shows examples of embossed patterns 15 which are marks and letters "R" and "E". This mark is embossed on the tire sidewall S using the hole 11 and inserted piece 2b shown in FIG. 5, wherein the hole 11 and inserted piece 2b have the same shape as the outline of the mark, and this piece 2b is inserted to a certain depth (d). The above-mentioned micro-gap 10 is formed continuously along the outline of the mark. If there is an independent dent in the surface of the pattern 15 such as the letter "R" shown in FIG. 4, an independent protruding part is formed on the surface 4b of the inserted piece 2b correspondingly thereto.

In the tire shown in FIG. 4, each of the embossed patterns 15 is a flat embossed pattern 15A whose surface is flat as contrasted with the undermentioned outline pattern 15B.

Figure 9:
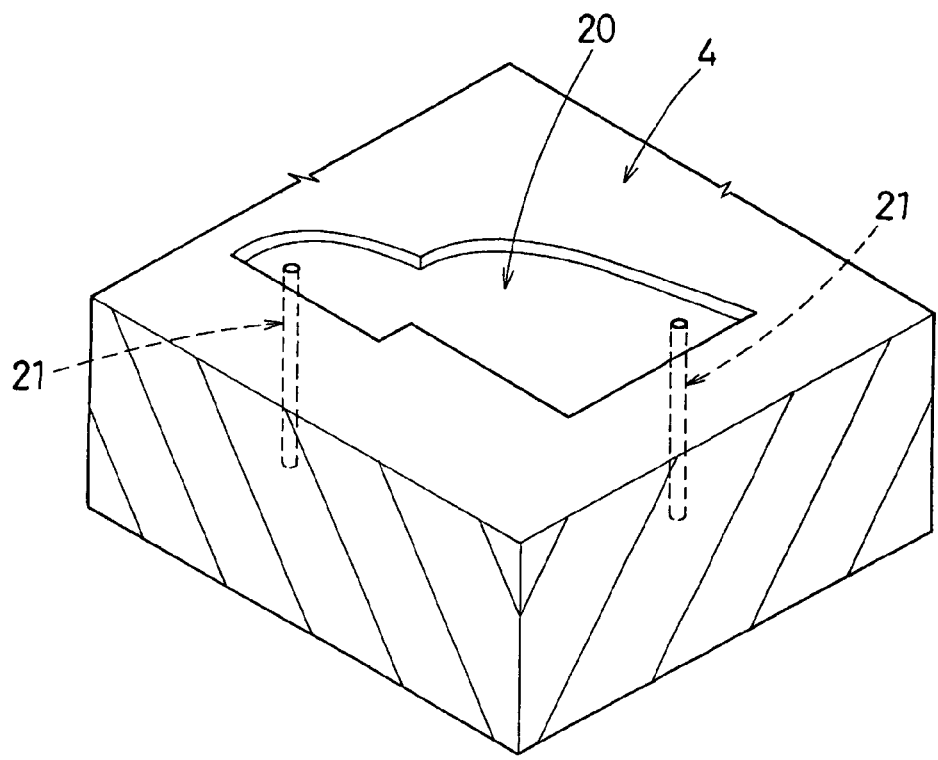
FIG. 9 is a perspective view for explaining a conventional vent structure based on vent holes.

When the area of such flat surface is more than 100 sq.mm, in case of conventional vent holes 21, it is necessary to provide one or more vent holes as shown in FIG. 9. However, in case of the micro-gap 10, if the area is increased up to about 500 sq.mm, the air can be effectively discharged without providing vent holes 21. Thus, in case of an embossed pattern 15A having a flat surface as shown in FIG. 4, it is preferable to limit the area of the inward surface 4b of one inserted piece 2b in a range of not more than 500 sq.mm, preferably not more than 300 sq.mm, but not less than 50 sq.mm. Accordingly, if a wide flat surface is necessary, it is better to divide the inserted piece 2b accordingly.

Figure 7:
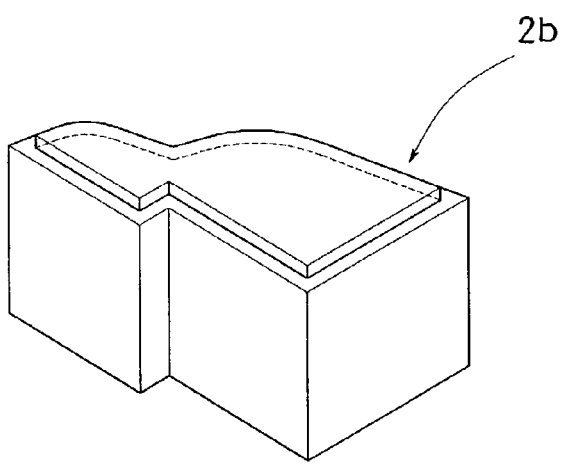
FIG. 7 is an enlarged perspective view of an inserted piece which can be utilized to form one of the embossed patterns shown in FIG. 6.
Figure 6:
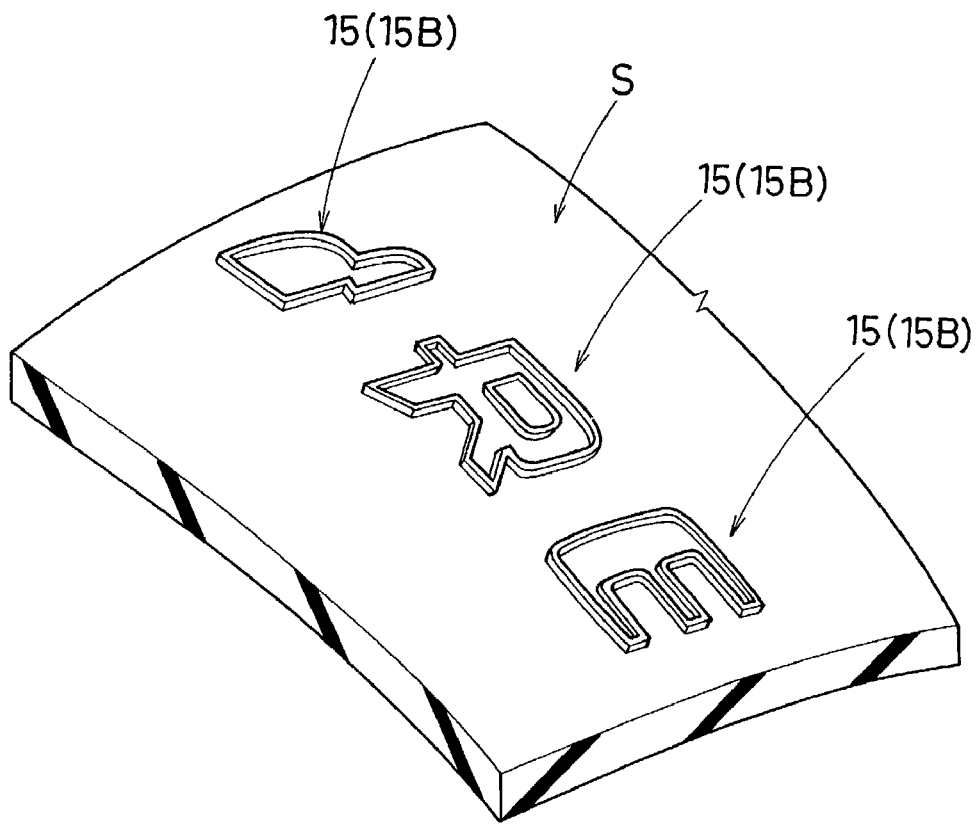
FIG. 6 is a perspective partial view of a tire sidewall showing other examples of the embossed patterns.

FIG. 6 shows another type of embossed patterns 15, namely, outline pattern 15B wherein only the outline thereof is embossed on the tire sidewall S. For example in the case of FIG. 5, by changing the inserted piece 2b to that shown in FIG. 7, such outline pattern can be easily formed.

In any case, if the depth (d) is more than 3.5 mm, molding deficiencies are likely to occur. Therefore, the depth (d) or the height of the embossed pattern 15 is set in a range of from 0.1 to 3.5 mm, preferably 0.2 to 2.0 mm, more preferably 0.5 to 1.5 mm.

In the case where the surface 4b of the inserted piece 2b is indented from the surface 4a as explained above, the edge 11e of the hole 11 can be chamfered as shown in FIG. 2, that is, the corner between the surface 4a and the interior surface 13 is rounded by a radius of curvature Ra which is smaller than the depth (d), for example, in a range of from 0.1 to 3.0 mm, preferably 0.2 to 2.0 mm.

Figure 8:
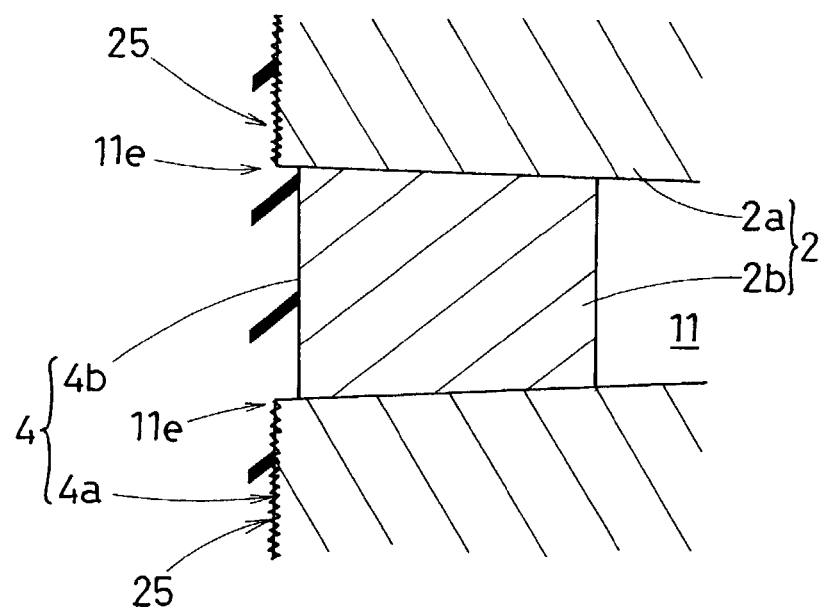
FIG. 8 is a cross sectional view showing a modification of the vent structure shown in FIG. 2.

In FIG. 8 showing a modification of the example shown in FIG. 2, the chamfering of the edge 11e is omitted but serrations 25 are formed around the hole 11.

The hole 11 shown in FIG. 3 has a bottom to stop the movement of the inserted piece 2b toward the bottom and thereby to position the surface 4b of the inserted piece 2b in the right place. Although the bottom can be utilized for positioning, it is also advantageous to provide a set screw for positioning an insert at an appropriate position, for example in the bottom of the hole 11, which is made deeper than illustrated.

In FIG. 2, the hole 11 is deeper and extends beyond the end of the inserted piece 2b. In this case, the movement of the inserted piece 2b toward the bottom is stopped by the close contact between the tapered surfaces of the hole 11 and piece 2b. It is however also possible to provide a stopper or a set screw for the purpose of positioning the surface 4b.

Further, as shown in FIG. 1, it is possible that the hole 11 penetrates through the main part 2a from the inside to the outside of the mold so as to be able to push out the inserted piece 2b against the engaging force between the tapered parts.

As explained above, when dividing the inserted piece 2b, it may be possible to divide it such that the divided parts are nested. When making an independent protruding part on the surface 4b of the inserted piece 2b as described above, aside from making it as an integral part, it is also possible to make it such that the protruding part and the reminder are nested. As the nesting is made in order to make the micro-gap 10, the gap must be extended through the hole 11 to a vent path which is connected with the above-mentioned suction pump.

By employing the above-described vent structure, it will be possible to eliminate conventional vent holes from the sidewall molding face, thus making it possible to reduce the number of spews on the sidewall to zero.

The present invention can be applied to various tire molds but suitably applied to a mold for a pneumatic tire whose sidewall rubber is very thin for example the rubber thickness is 1–2 mm.

The invention claimed is:

1. A tire mold comprising
a molding face for shaping the outside of a tire and
a vent structure,
the vent structure including
a hole having at least one opening in the molding face,
an inserted piece provided in the hole so that the surface of the inserted piece defines a part of a molding face, and
a micro-gap of not more than 100 micrometers formed between an exterior surface of the inserted piece and an interior surface of the hole for the purpose of venting wherein
said exterior surface of the inserted piece is provided with
a non-taper part extending from the inner end towards the outer end of the inserted piece, and
a taper part tapered extending from the non-taper part towards the outer end of the inserted piece so as to increase the gap between the exterior surface and said interior surface of the hole, wherein
the length of the non-taper part in the depthwise direction of the hole is not more than 1 mm, and
in the non-taper part the micro-gap is in a range of from 5 to 10 micrometers,
said surface of the inserted piece is in a range of from 50 to 500 sq.mm in area, and said surface is provided with no vent hole, and
said inserted piece is divided so that said surface thereof is also divided, and a micro-gap of not more than 100 micrometers is also formed along the parting line of the divided surface.

2. A tire mold comprising
a molding face for shaping the outside of a tire and
a vent structure,
the vent structure including
a hole containing having at least one opening in the molding face,
an inserted piece disposed in the hole so that the surface of the inserted piece defines a part of a molding face, and
a micro-gap of not more than 100 micrometers formed between the inserted piece and the hole for the purpose of venting, wherein
the inserted piece has an exterior surface which comes in contact with an interior surface of the hole, and at least one of the exterior surface and interior surface is provided with a roughness to make said micro-gap therebetween, and
said exterior surface is provided with
a non-taper part extending from the inner end towards the outer end of the inserted piece, and
a taper part tapered extending from the non-taper part towards the outer end of the inserted piece so as to increase the gap between the exterior surface and said interior surface of the hole, wherein
the length of the non-taper part in the depthwise direction of the hole is not more than 1 mm, and in the non-taper part the micro-gap is in a range of from 5 to 10 micrometers.

3. The tire mold according to claim 2, wherein
the area of said surface of the inserted piece is in a range of from 50 to 500 sq.mm and said surface is provided with no vent hole.

4. The tire mold according to claim 1 or 2, wherein
the depth of said surface of the inserted piece in the hole is not more than 3.5 mm.

5. The tire mold according to claim 4, wherein the depth is substantially zero.

6. The tire mold according to claim 2, wherein
said inserted piece is divided so that the surface of the inserted piece is also divided, and a micro-gap of not more than 100 micrometers is also formed along the parting line of the divided surface.

7. The tire mold according to claim 6, wherein
the divided parts of the inserted piece are arranged side by side.

8. The tire mold according to claim 6, wherein
the divided parts of the inserted piece are nested.

9. A method of manufacturing a tire by using a tire mold according to claim 1, which comprises
placing a raw tire in the tire mold,
discharging the air through the micro-gap by using a suction pump, and
vulcanizing and molding the tire by heating the tire while applying a pressure to the inside of the tire.

10. The tire mold according to claim 1 or 2, wherein
the hole has a bottom contacting with the end of the inserted piece for the purpose of positioning the surface of the inserted piece.

11. The tire mold according to claim 1 or 2, wherein
the hole is provided in the bottom with a set screw for positioning the inserted piece.

12. The tire mold according to claim 1 or 2, wherein
the taper angle of said taper part is not more than 3 degrees.

* * * * *